United States Patent
Shrock

[15] 3,646,830
[45] Mar. 7, 1972

[54] VARIABLE RATIO LEVER MECHANISM

[72] Inventor: Larry R. Shrock, Westland, Mich.

[73] Assignee: Larry R. Schrock, Dearborn, Mich.

[22] Filed: June 1, 1970

[21] Appl. No.: 42,408

[52] U.S. Cl. ................................................74/516
[51] Int. Cl. ..................................................G05g 1/14
[58] Field of Search ......................................74/516

[56] References Cited

UNITED STATES PATENTS

| | | | |
|---|---|---|---|
| 3,142,199 | 7/1964 | Burton et al. | 74/516 |
| 3,466,943 | 9/1969 | Leguen De Lacroix | 74/516 |
| 3,310,994 | 3/1967 | Schroter | 74/516 |

*Primary Examiner*—William F. O'Dea
*Assistant Examiner*—F. D. Shoemaker
*Attorney*—John R. Faulkner and Roger E. Erickson

[57] ABSTRACT

A variable ratio lever mechanism adaptable for use as a parking brake control pedal assembly. The mechanism includes a control lever pivotally connected to a support structure by a pair of links. The pivotal connections between the lever and first link and between the support structure and the second link have a common first axis; the pivotal connections between the lever and the second link and between the support structure and the first link have a common second axis. The mechanism provides a lesser mechanical advantage during initial application of the parking brake and a greater mechanical advantage following initial application.

5 Claims, 5 Drawing Figures

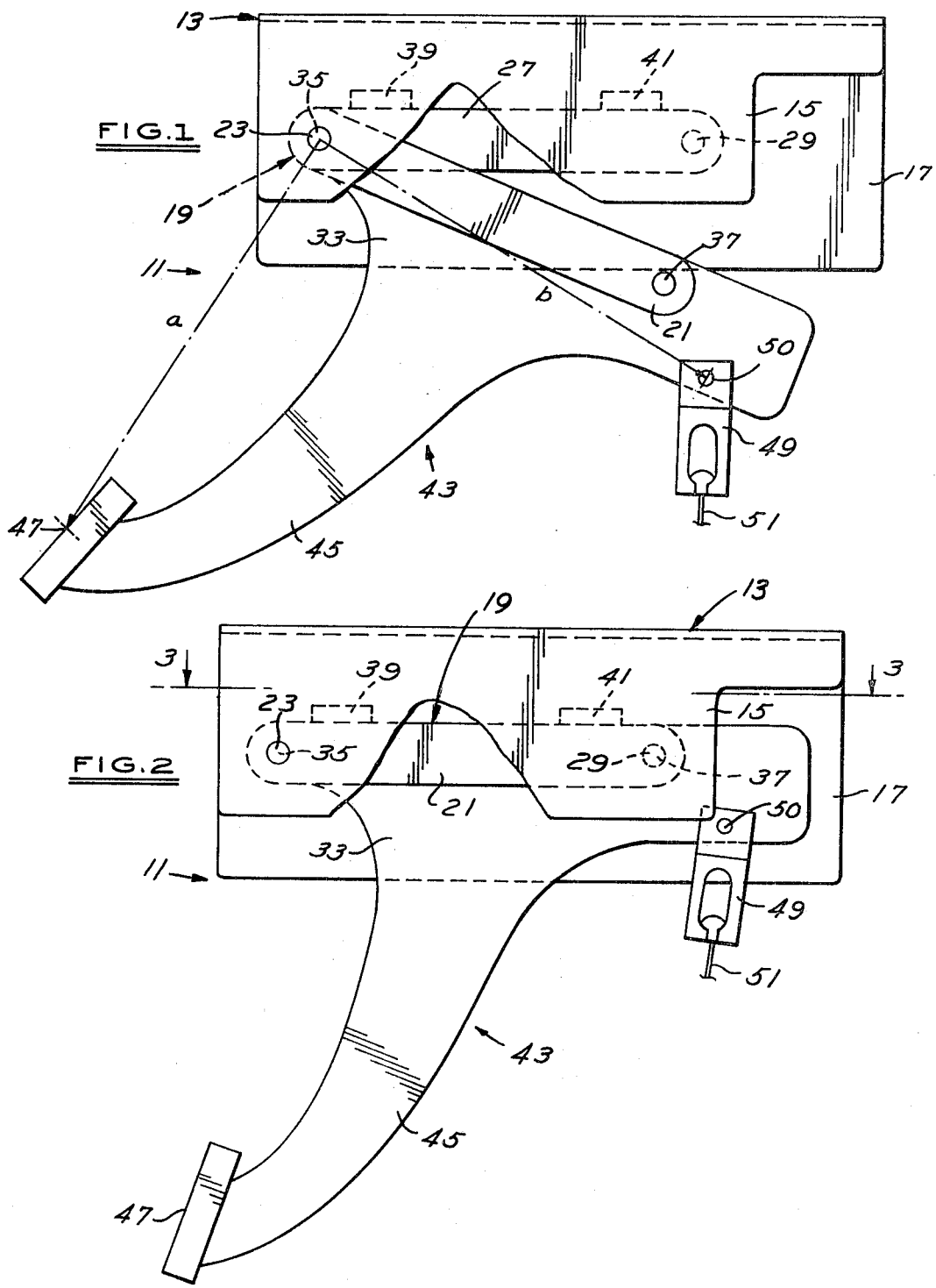

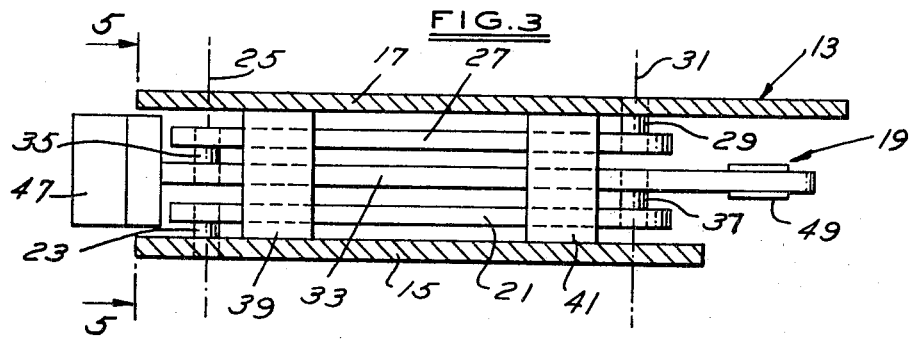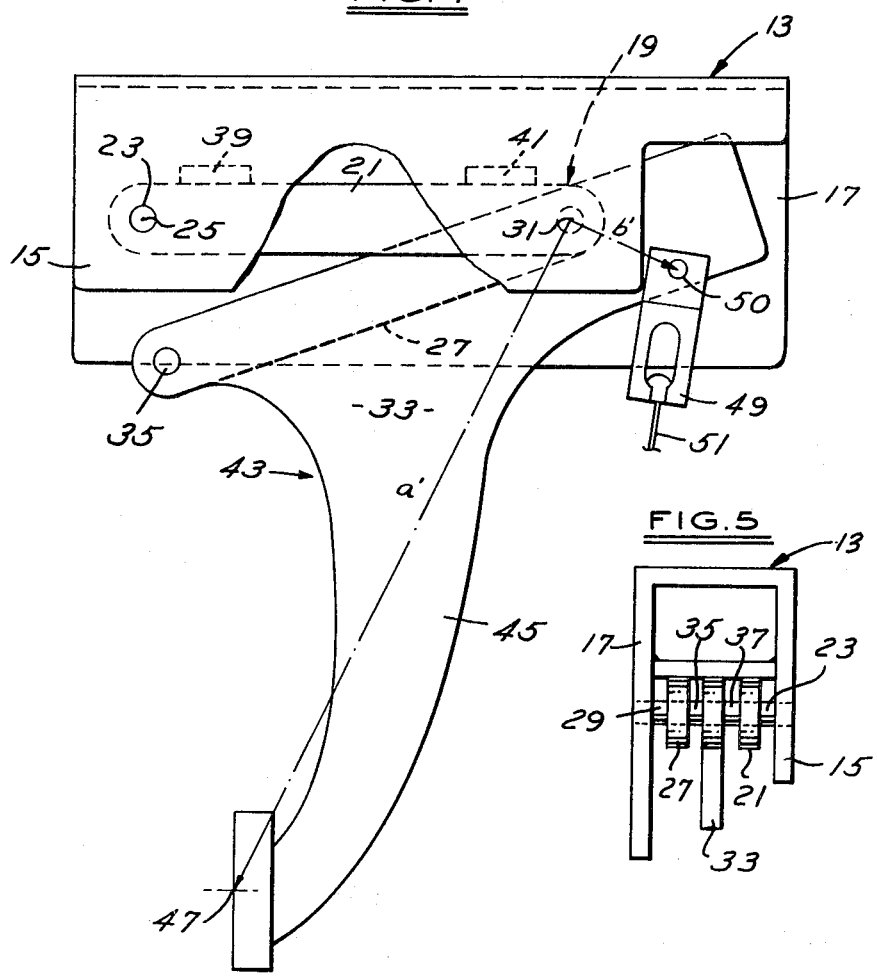

VARIABLE RATIO LEVER MECHANISM

BACKGROUND AND SUMMARY OF THE INVENTION

A conventional parking brake control pedal assembly has a single-pivot center and a fixed ratio or mechanical advantage during its entire range of travel. It is often desirable to have a lesser mechanical advantage and greater economy of movement during slack takeup and initial application and a greater mechanical advantage during the remaining application of the pedal lever. This invention provides such a parking brake control assembly in which the pedal lever pivots about a first point during the initial portion of its travel and about a second point during the latter portion of its travel range. The invention also provides a dual ratio pedal assembly which includes no sliding contacts between elements other than pivotal connections. The invention further provides a dual ratio lever assembly which is economical to manufacture and reliable in operation.

A variable ratio lever means constructed in accordance with this invention includes a pair of support members spaced from, but fixed relative to, each other. A first axis intersects the first support member and a second axis intersects the second support member and is spaced from and substantially parallel to the first axis. A first link is connected to the first support member to pivot about the first axis; similarly, a second link is connected to the second support member to pivot about the second axis. A third link has a first pivotal connection with the second link alignable with the first axis and a second pivotal connection with the first link alignable with the second axis. The third link includes a lever member constructed to transmit a force from one point of the lever member to another. The lever member during its initial movement pivots about the first axis and during its latter movement, about the second axis to provide an increase in the mechanical advantage of the lever.

BRIEF DESCRIPTION OF THE DRAWINGS

FIG. 1 is a side view, with portions broken away, of a brake pedal lever assembly in a normal brake released attitude and in a position to pivot about the first axis.

FIG. 2 is a side view of the invention in an intermediate position in which pivotal motion of the lever member about the first pivot axis is just completed and motion about the second pivot axis is about to begin.

FIG. 3 is a view taken in the direction of line 3—3 of FIG. 2.

FIG. 4 is a side view of the invention showing the lever member positioned to pivot about the second axis.

FIG. 5 is a view taken in the direction at line 5—5 of FIG. 3.

DETAILED DESCRIPTION OF A PREFERRED EMBODIMENT

A variable ratio parking brake foot control assembly is referred to generally by the numeral 11. A generally U-shaped cross section mounting bracket 13 pivotally carries the moving elements of the assembly and provides a structure by which the assembly can be attached to the under dash or body portion of a motor vehicle (not shown). The bracket has two depending portions or support members 15 and 17 which form substantially parallel plane surfaces.

The linkage assembly 19 consists primarily of a first link 21 pivotally connected by pin 23 to the first support member 15 to pivot about a first pivot axis 25. A second link 27 is pivotally connected to the second support member 17 by pin 29 to pivot about a second pivot axis 31. A third link 33 is pivotally connected to the second link 27 by pin 35 and to the first link 21 by pin 37. When all links are in the intermediate position as shown in FIG. 2, in which each of the links engages the stop members 39 and 41, the axes of pin 35 and pin 37 are colinear with the first pivot axis 25 and a second pivot axis 31, respectively.

The third link or middle link 33 includes in this embodiment a pedal lever assembly 43 having a depending portion 45 and a foot pad portion 47. A connector 49 is joined by pin 50 to another portion of the pedal assembly and receives a cable 51 which connects with the parking brake mechanism (not shown).

OPERATION

FIG. 1 shows the pedal lever assembly 43 in the brakeoff position. As the pedal assembly rotates counterclockwise from the position of FIG. 1 to the position of FIG. 2 it pivots about axis 25 passing through pivot pins 23 and 35. The mechanical advantage of the pedal lever as the assembly 43 travels from the position of FIG. 1 to the position of FIG. 2 is the ratio $a/b$ as is shown in FIG. 1. The mechanical advantage of the pedal in this embodiment is approximately one during its initial travel. This is desirable for during the period of slack takeup and initial application of the parking brake, the force necessary to accomplish the desired displacement is not as great as is required during the later portion of travel of the pedal lever.

As the lever assembly 43 travels from the position of FIG. 2 to the position of FIG. 4 it pivots about axis 31 passing through pin 29 and 37. During this latter pivotal travel, the mechanical advantage or ratio is $a'/b'$ or approximately seven in the illustrated embodiment. This increased mechanical advantage provides a significantly increased force to the brake cable 51 and associated brake components without the vehicle operator having to provide a corresponding increase in force at the foot pedal pad 47.

It may be noted that the mechanical advantage of the assembly may be adjusted by changing the location of the pivot points or the locations of the points of force application which are the pedal pad 47 and the pin 50.

Other alterations and modifications will occur to those skilled in the art which are included within the scope of the following claims:

I claim:

1. A position responsive variable ratio lever assembly comprising
    a support member,
    a first link and first pivot means connecting said first link to said support member to pivot about a first axis,
    a second link and second pivot means connecting said second link to said support member to pivot about a second axis,
    a lever member connected to said first and second links and having a force applying portion and a fixed point thereon adapted to be connected to a load,
    said lever member being constructed to pivot about said first axis only during one portion of its displacement and about said second axis only during the remaining portion of its displacement,
    the mechanical advantage of said lever being greater during pivotal movement about one of said axes than the other.
2. A lever assembly comprising
    a first support means,
    a second support means spaced from said first support means being fixed in position relative thereto,
    a first axis intersecting said first support means,
    a second axis intersecting said second support means, said second axis being spaced from and substantially parallel to said first axis,
    a first link connected to said first support means to pivot about said first axis,
    a second link connected to said second support means to pivot about said second axis,
    a third link having a first pivotal connection with said second link alignable with said first axis and a second pivotal connection with said first link alignable with said second axis,
    said third link including a lever member constructed to transmit a force from one portion thereof to another.
3. A lever assembly according to claim 2 and including:
    stop means precluding movement of said third link about said second axis and permitting pivotal movement of said third link about said first axis during one portion of lever travel, said stop means also precluding pivotal movement of said third link about said first axis and permitting pivotal movement of said third link about said second axis during another portion of lever travel.

4. A lever assembly according to claim 2 and including: said lever member comprising a depending pedal for control of an automobile parking brake.

5. A lever assembly according to claim 3 and including: said lever member comprising a depending pedal for control of an automobile parking brake.

* * * * *

UNITED STATES PATENT OFFICE
CERTIFICATE OF CORRECTION

Patent No. 3,646,830      Dated March 7, 1972

Inventor(s) Larry R. Schrock

It is certified that error appears in the above-identified patent and that said Letters Patent are hereby corrected as shown below:

On the cover sheet [73] the assignee should read -- FORD MOTOR COMPANY, DEARBORN, MICHIGAN, a corporation of Delaware --.

Signed and sealed this 7th day of November 1972.

(SEAL)
Attest:

EDWARD M. FLETCHER, JR.
Attesting Officer

ROBERT GOTTSCHALK
Commissioner of Patents